US006961784B1

(12) United States Patent
Goodemote et al.

(10) Patent No.: US 6,961,784 B1
(45) Date of Patent: Nov. 1, 2005

(54) METHOD AND SYSTEM FOR PROCESSING NON-DATA FRAMES IN HOST BUS ADAPTERS

(75) Inventors: Gregory J. Goodemote, Lake Forest, CA (US); Ben K. Hui, Irvine, CA (US)

(73) Assignee: QLogic Corporation, Aliso Viejo, CA (US)

( * ) Notice: Subject to any disclaimer, the term of this patent is extended or adjusted under 35 U.S.C. 154(b) by 0 days.

(21) Appl. No.: 10/417,523

(22) Filed: Apr. 17, 2003

(51) Int. Cl.[7] .............................................. G06F 3/00
(52) U.S. Cl. ............................ 710/5; 710/52; 710/62; 710/64; 710/300; 709/217; 709/218; 709/219
(58) Field of Search ........................... 710/5–7, 52–57, 710/62, 64, 300; 709/230–237, 217–219

(56) References Cited

U.S. PATENT DOCUMENTS

| 5,568,614 | A | * | 10/1996 | Mendelson et al. ......... 709/231 |
| 5,917,723 | A | * | 6/1999 | Binford .......................... 700/2 |
| 6,185,620 | B1 | * | 2/2001 | Weber et al. ................ 709/230 |
| 6,457,090 | B1 | * | 9/2002 | Young ......................... 710/313 |
| 6,502,189 | B1 | * | 12/2002 | Westby ........................... 713/1 |
| 6,526,458 | B1 | * | 2/2003 | Steinmetz et al. ............. 710/1 |
| 6,721,799 | B1 | * | 4/2004 | Slivkoff ...................... 709/236 |

* cited by examiner

Primary Examiner—Kim Huynh
Assistant Examiner—Mike Nguyen
(74) Attorney, Agent, or Firm—Tejinder Singh; Klein, O'Neill & Singh, LLP

(57) ABSTRACT

A method and system processing non-data frames in a host bus adapter with a main processor and a first processor coupled to a host system and fibre channel is provided. The method includes, examining non-data frames; storing non-data frame information; notifying the first processor of non-data frames; and processing non-data frames without generating an interrupt for the main processor. The host bust adapter includes a fibre channel module ("FPM") with a state machine, wherein the fibre channel module receives and examines the non-data frames and stores non-data frame information in a FIFO. The FPM notifies the first processor that the non-data frames have been received.

11 Claims, 4 Drawing Sheets

METHOD AND SYSTEM FOR PROCESSING NON-DATA FRAMES IN HOST BUS ADAPTERS

BACKGROUND

1. Field of the Invention

The present invention relates to data storage systems, and more particularly to routing non-data frames.

2. Background of the Invention

Fibre channel is a set of American National Standard Institute (ANSI) standards which provide a serial transmission protocol for storage and network protocols such as HIPPI, Small Computer Systems Interface ("SCSI"), IP, ATM and others. Fibre channel provides an input/output interface to meet the requirements of both channel and network users.

SCSI is commonly used to transfer information between a host computer system and a storage device (for example, a SCSI device). SCSI is an industry standard that defines a system level bus with intelligent controllers on each device to manage flow of information.

In a typical SCSI exchange, an initiator sends a "read" or "write" command to a target. For a read operation, the target sends the requested data to the initiator. For a write command, the target sends a "Ready to Transfer" response informing the initiator that the target is ready to accept the write data. The initiator then sends the write data to the target. Once the data is transferred, the exchange enters the response phase. The target then sends a response to the initiator with the status of the operation. Once the initiator receives this response, the exchange is complete.

In a typical fibre channel system, a host computer uses a host bus adapter ("HBA") to transfer data from and to a host. Host adapters receive frames either from a host or from a fibre channel device (for example, a SCSI device) and then facilitate transfer of data.

In conventional systems, an HBA includes a single processor that analyzes every incoming frame, extract the required information to continue or terminate data exchange. Even if no action is required to process the frame, the processor must still analyze it. This slows the overall process of data transfer and is hence not desirable in today's systems where transfer and processing times must be efficient.

Therefore, what is required is a system that minimizes processor involvement if no substantive action is required by the HBA processor.

SUMMARY OF THE INVENTION

In one aspect of the present invention, a method for processing non-data frames in a host bus adapter with a main processor and a first processor, coupled to a host system and fibre channel, is provided. The method includes, examining non-data frames; storing non-data frame information; notifying the first processor of non-data frames; and processing non-data frames without generating an interrupt to the main processor.

In another aspect, a system for processing non-data frames is provided. The system includes, the host adapter with the main processor and the first processor; and the fibre channel module with a state machine, wherein the fibre channel module receives and examines the non-data frames and stores non-data frame information in a FIFO and notifies the first processor that non-data frames have been received.

In one aspect of the present invention, no interrupt is generated to notify the main processor of an HBA to process non-data frames. This saves main processor resources and improves the overall efficiency of HBAs.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

The following definitions are provided as they are typically (but not exclusively) used in the fibre channel/SCSI environment, implementing the various adaptive aspects of the present invention.

"CS-CTL": Class Specific Control defined by Fibre Channel Standard.

"DF_CTL": Data Field Control defined by Fibre Channel Standard.

"D-ID": Destination Identifier defined by Fibre Channel Standard.

"EOF" End of Frame

"EOFt": End of Frame, Terminate

"FC": Fibre Channel

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"F_CTL": Frame Control defined by Fibre Channel Standard.

"FCP_RSP": Defined by Fibre Channel standard and provides completion information for a fibre channel input/output operation.

"R_CTL" FC-4 device data command status defined by Fibre Channel Standard.

"SCSI_FCP": FC-4 protocol mapping of SCSI command protocol for a physical fibre channel interface.

"SOF": Start of Frame

"SOFi3": Start of Frame, Initiate Class 3

To facilitate an understanding of the preferred embodiment, the general architecture and operation of a host system with a driver will be described. The specific architecture and operation of the preferred embodiment will then be described with reference to the general architecture of the host system and host controller.

Figure 1:
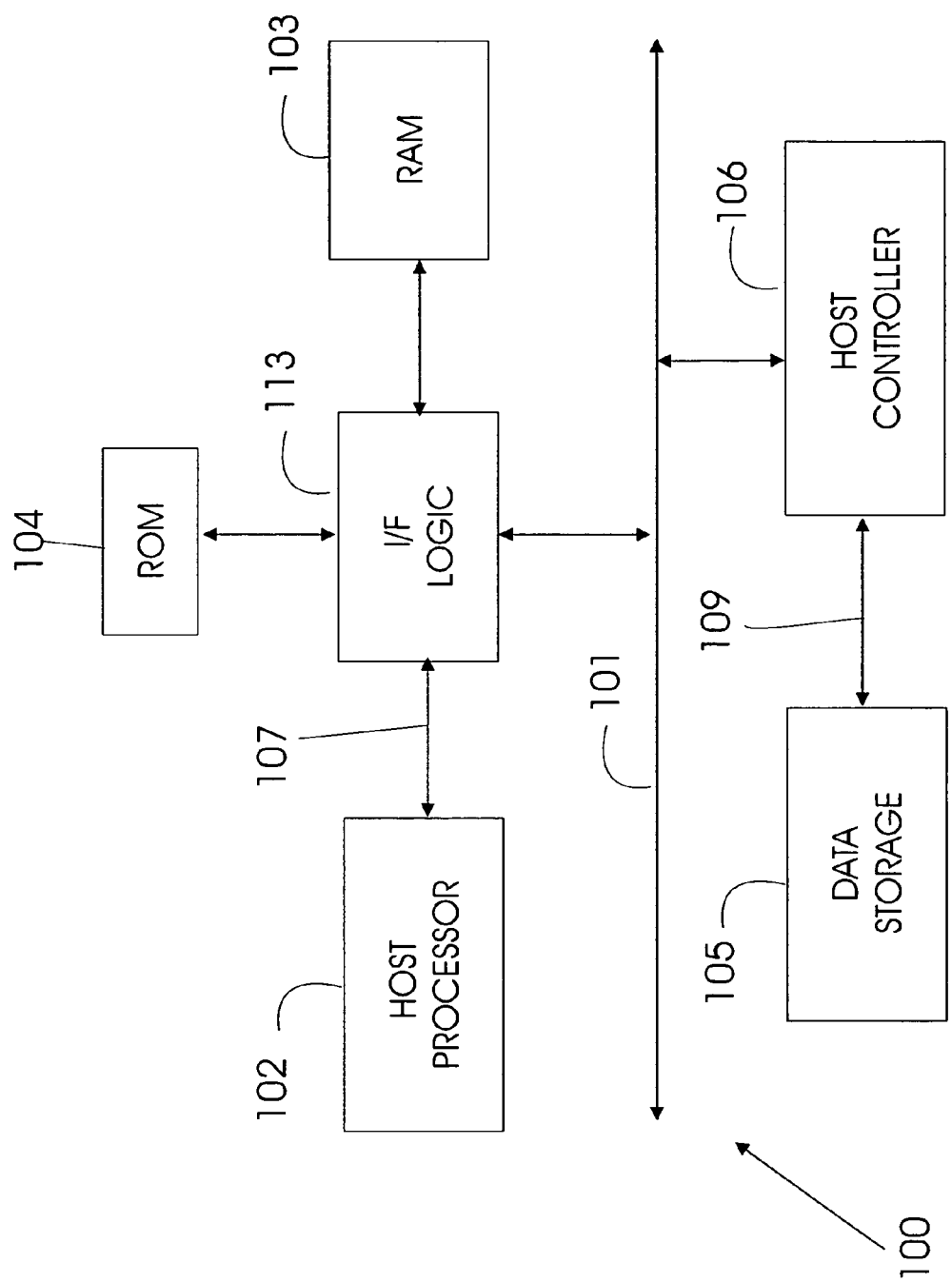
FIG. 1 shows a block diagram of a host system that uses a host bus adapter, according to one aspect of the present invention.

FIG. 1 shows a block diagram of a system 100 representing a computer, server or other similar devices, which may be coupled to a fiber channel fabric or any other system to facilitate communication. In general, system 100 typically includes a host processor 102 that is coupled to computer bus 101 for processing data and instructions. Computer bus 101 may be a PCI/PCI-X bus. In one aspect of the present invention, host processor 102 may be a Pentium Class microprocessor manufactured by Intel Corp™.

A computer readable volatile memory unit 103 (for example, random access memory unit) may be provided for temporarily storing data and instructions for host processor 102.

A computer readable non-volatile memory unit 104 (for example, read-only memory unit) may also be provided for storing non-volatile data and instructions for host processor 102. Data Storage device 105 is provided to store data and may be a magnetic or optical disk.

Interface logic 113 interfaces host processor 102 with memory modules 103, 104 and bus 101. It is noteworthy that host processor 102 may be directly coupled to bus 101.

System 100 includes a host controller 106 (also known as a host bus adapter or "HBA") that facilitates data transfer to and from data storage 105.

Figure 2:
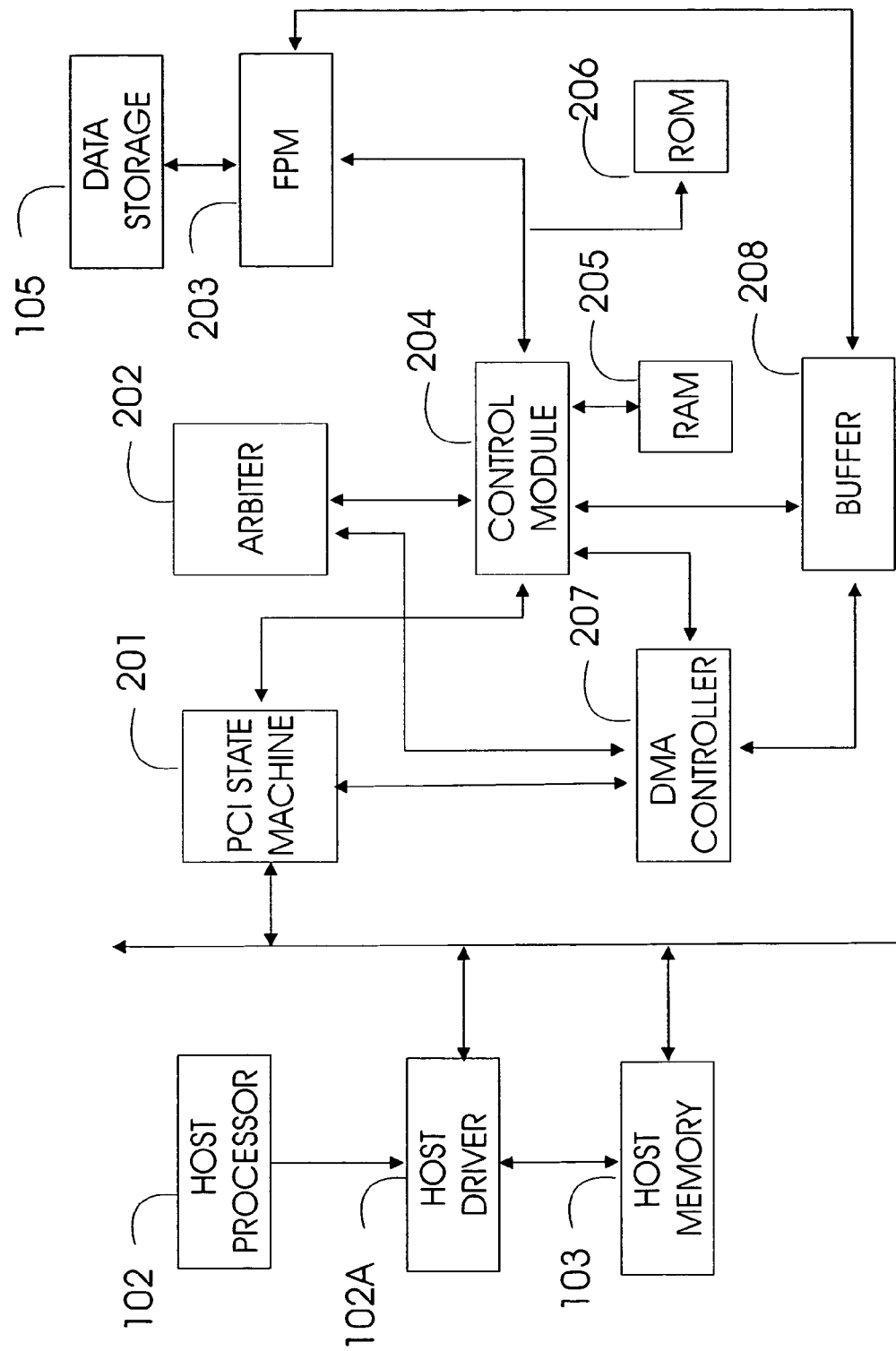
FIG. 2 shows a block diagram with a host operationally coupled to a host adapter using the various aspects of the present invention.

FIG. 2 shows a block diagram of system 100 with various components of HBA 106. HBA 106 is coupled to a PCI/PCI-X bus 101 via a PCI interface unit (or state machine) 201.

HBA 106 includes arbitration logic 202 that is coupled to a DMA controller 207. DMA units are used to perform transfers between memory locations, or between memory locations and an input/output port. The transfer control information generally includes source address (the address of the beginning of a block of data to be transferred), the destination address, and the size of the data block.

HBA 106 includes a control module 204, that includes a processor (for example, a RISC processor, a processor on the receive side and a processor on the transmit side) as described below with respect to FIG. 3. Module 204 is operationally coupled with random access memory (RAM) 205, read only memory (ROM) 206 and buffer 208.

Module 204 is also operationally coupled to a fibre channel protocol module ("FPM") 203 that receives frames from fibre channel both inwards (to host 100) and outwards from host 100. FPM 203 includes a FIFO where frames are received. Some of the frames are non-data frames. An example of non-data frames are "good status" and transfer ready frames".

An example of a good status frame is provided below:

(a) If the first number of bytes (for example, 12 bytes) of an FCP_RSP (Fibre Channel defined command) payload are all zero.

(b) If there is no D_ID (destination identifier, defined by Fibre Channel standard) error.

(c) Class 3 Frames only (as defined by Fibre Channel Standard): SOFi3 and EOFt (d) R_CTL provides FC-4 Device Data, Command Status.

(e) F_CTL matches firmware provided value. Frame TYPE is SCSI_FCP (0×08)

(f) CS_CTL field is zero.

(g) DF_CTL field is zero.

(h) Parameter field is zero if "Enable Parameter Checking" bit is set.

(i) There are no Receive Errors, Transfer length Errors, or bad EOFs.

A transfer ready frame is a non-data frame that is send by a storage device (105) indicating that data is ready to be transferred. An example of a transfer ready frame is given below:

(a) Frame Payload length of a certain size (for example, 12 bytes).

(b) There is no D_ID error.

(c) For Class 3 frames only: SOFi3 and EOFt (d) R_CTL indicates FC-4 Device Data, and Data Descriptor.

(e) The value for F_CTL is 0×890000.

(f) The frame TYPE is SCSI_FCP.

(g) CS_CTL field is zero.

(h) DF_CTL field is zero.

(i) Parameter field is zero if "Enable Parameter Checking" bit is set.

(j) There are no Receive Errors, Transfer length Errors, or bad EOFs.

The foregoing examples of good status frames and transfer ready frames are to illustrate the various adaptive aspects of the present invention and are not intended to limit the present invention to particular format types or frames sizes.

Non-data frames are examined and if they are for "good status" or "transfer ready", as defined above, then the frames are organized and stored for RISC processor use. This avoids causing an interrupt for the RISC processor every time a non-data frame needs to be processed.

Figure 3:
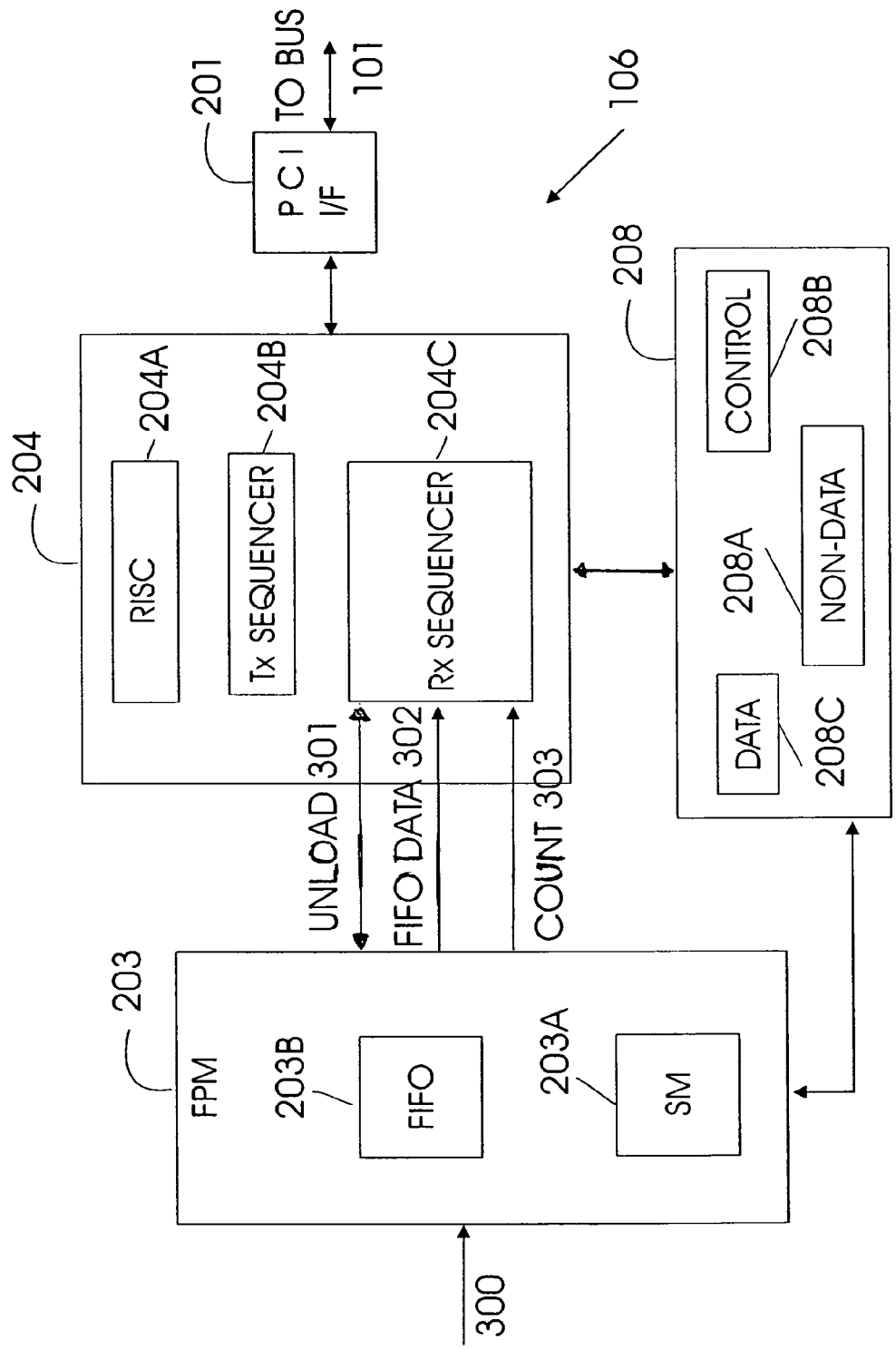
FIG. 3 shows a block diagram of the host adapter components using the various aspects of the present invention.

FIG. 3 shows a detailed block diagram of HBA 106 that includes control module 204. In one aspect, control module 204 includes a processor (RISC or main processor) 204A, a transmit sequencer (or processor) (Tx) 204B that manages transmit operations from HBA 106 and a receive sequencer (or processor) (Rx) 204C that manages receive operations.

HBA 106 also includes buffer 208 for storing information. In one aspect, information may be stored as non-data frames 208A, control information 208B and received data 208C. Non-data frames 208A may include good status frames and transfer ready frames. Frame buffer 208 is operationally coupled to control module 204. This allows the various modules of control module 204 to read data from or write data to buffer 208.

Incoming frame(s) 300 are received by FPM 203. FPM 203 includes a state machine 203A that examines all frames 300. FPM 203 identifies if the frame is a "good status" frame OR "transfer ready". In one aspect of the present invention, FPM 203 includes a FIFO to store incoming non-data frame information before the frames are transferred to buffer 208.

If a good status or transfer ready frame is found, then the frame is stored in FIFO 203B. An entry for the non-data frame is created and a bit is set that signals Rx Sequencer 204C (via signal 301) to access/unload the non-data frame to frame buffer 208. In one aspect of the present invention, RISC 204A does not have to be interrupted to process the non-data frame.

Figure 4:
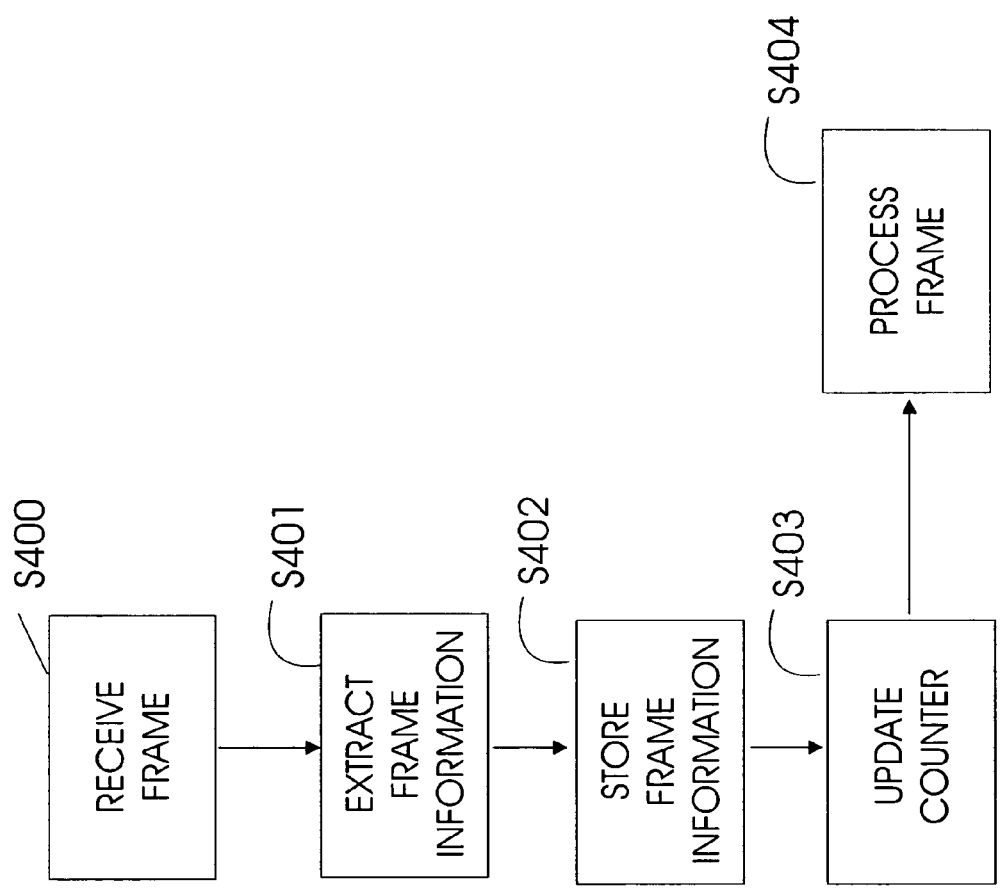
FIG. 4 shows a flow diagram of process steps for handling non-data frames according to one aspect.

FIG. 4 is a flow diagram showing process steps for validating non-data frames.

In step S400, plural frames are received by FPM 203.

In step S401, FPM state machine 203A examines the incoming frames and recognizes non-data frames. Frame header information is extracted and stored in FIFO 204B.

In step S403, a counter in Rx Sequencer 204C is updated, indicating to Rx Sequencer 204C that a non-data frame has been received.

In step S404, Rx Sequencer 204C uploads and processes the non-data frames.

In one aspect of the present invention, no interrupt is generated to notify RISC 204A (or main processor of HBA 106) to process the non-data frames. This saves RISC 204A resources and improves overall efficient of HBA 106.

Although the present invention has been described with reference to specific embodiments, these embodiments are illustrative only and not limiting. Many other applications and embodiments of the present invention will be apparent in light of this disclosure and the following claims.

What is claimed is:

1. A method for processing non-data frames by a host bus adapter with a main processor and a first processor, wherein the host bus adapter is coupled to a host system having its own processor and to a fibre channel network, comprising:

examining non-data frames, wherein a state machine in a fibre channel protocol module examines the non-data frames received from the fibre channel network;

extracting frame header information from the on-data frames;

storing non-data frame header information in a receive path of the host bus adapter, wherein a memory located in the fibre channel protocol module stores non-data frame information;

notifying the first processor of non-data frames, wherein a signal from the state machine of the fibre channel protocol module indicates to the first processor that a non-data frame has been received; and processing non-data frames without generating an interrupt for the main processor of the host bus adapter, wherein the first processor of the host bus adapter processes the non-data frames instead of the main processor of the host bus adapter.

2. The method of claim 1, wherein the non-data frames are stored in a FIFO based memory in the fibre channel protocol module.

3. The method of claim 1, further comprising:

uploading the non-data frames for processing, wherein the first processor uploads the non-data frame for processing.

4. The method of claim 1, wherein the main processor is a RISC processor.

5. The method of claim 1, wherein the non-data frames may be non-data SCSI frames, including a good status and/or transfer ready frame.

6. A system for processing non-data frames, comprising:

a host bus adapter with a main processor coupled to a host system having its own processor;

a first processor that controls receive operations; and a fibre channel module with a state machine, wherein the fibre channel module receives non-data frames and the state machine examines the non-data frames, extracts frame header information of the non-data frames and stores non-data frame information in a FIFO in a receive path and notifies the first processor that the non-data frames have been received, wherein the first processor instead of the main processor uploads and processes the non-data frames without sending an interrupt to the main processor.

7. The system of claim 6, wherein the non-data frames may be non-data SCSI frames, including a good status and/or transfer ready frame.

8. The system of claim 6, wherein the main processor of the host bus adapter is a RISC processor.

9. A host bus adapter for processing non-data frames operationally coupled to a host system having its own processor, comprising:

a main processor;

a first processor that controls receive operations; and a fibre channel protocol module with a state machine, wherein the fibre channel protocol module receives non-data frames and the state machine examines the non-data frames, extracts header information of the non-data frames and stores non-data frame information in a FIFO in a receive path and notifies the first processor that the non-data frames have been received, wherein the first processor instead of the main processor uploads and processes the non-data frames without sending an interrupt to the main processor.

10. The host bus adapter of claim 9, wherein the non-data frames may be non-data SCSI frames, including a good status and/or transfer ready frame.

11. The host bus adapter of claim 9, wherein the main processor of the host bus adapter is a RISC processor.

\* \* \* \* \*